(12) United States Patent
Wang et al.

(10) Patent No.: US 6,833,096 B2
(45) Date of Patent: Dec. 21, 2004

(54) METHOD FOR REMOVING WATER AND OTHER VOLATILE COMPONENTS FROM POLYMER POWDERS

(75) Inventors: Hua Wang, Clifton Park, NY (US); Eric Thomas Gohr, Mt. Vernon, IN (US)

(73) Assignee: General Electric Company, Niskayuna, NY (US)

( * ) Notice: Subject to any disclaimer, the term of this patent is extended or adjusted under 35 U.S.C. 154(b) by 363 days.

(21) Appl. No.: 09/942,066

(22) Filed: Aug. 29, 2001

(65) Prior Publication Data

US 2003/0067089 A1 Apr. 10, 2003

(51) Int. Cl.[7] .................. B29C 47/76; B29C 47/38; B29C 47/40
(52) U.S. Cl. ............... 264/102; 264/211; 264/211.23
(58) Field of Search .................. 264/102, 165, 264/211.23, 211, 172.11

(56) References Cited

U.S. PATENT DOCUMENTS

| | | | |
|---|---|---|---|
| 4,845,193 A | 7/1989 | Umemura et al. | |
| 5,079,307 A | 1/1992 | Taylor et al. | |
| 5,232,649 A | 8/1993 | Andersen et al. | |
| 5,717,055 A | 2/1998 | Hosomi et al. | |
| 6,365,710 B1 * | 4/2002 | Wang et al. | 528/480 |
| 6,482,916 B1 * | 11/2002 | Takuma et al. | 528/196 |
| 6,492,485 B1 * | 12/2002 | Gohr et al. | 528/196 |
| 6,599,446 B1 * | 7/2003 | Todt et al. | 252/511 |

FOREIGN PATENT DOCUMENTS

| | | |
|---|---|---|
| EP | 410650 A1 | 1/1991 |
| JP | 9193230 | 7/1997 |

* cited by examiner

*Primary Examiner*—Leo B. Tentoni
*Assistant Examiner*—Monica A. Fontaine
(74) *Attorney, Agent, or Firm*—Andrew J. Caruso; Patrick K. Patnode

(57) ABSTRACT

A method for removing volatile components from wet, polymer powders using a vacuum vented extruder is described. Polymer powders containing substantial amounts of water, 1–20% by weight, are rapidly converted to polymer compositions containing less than about 0.5% by weight water at high throughput rates while avoiding complications resulting from excessive steam backflow through the extruder feed throat. The method provides a screw design comprising a powder seal section upstream of kneading and melting sections of the extruder. Steam generated as the polymer is heated flows downstream to one or more vacuum vents for removal. The partially devolatilized polymer melt is then subjected to additional melt kneading and vacuum venting. The method converts wet polycarbonate powder containing residual methylene chloride to essentially dry polycarbonate powder containing less than about 1 ppm methylene chloride.

43 Claims, 3 Drawing Sheets

METHOD FOR REMOVING WATER AND OTHER VOLATILE COMPONENTS FROM POLYMER POWDERS

BACKGROUND OF THE INVENTION

This invention relates to a method for removing volatile components such as water and volatile organic compounds such as solvents from polymer powders using an extruder. The method of the present invention avoids excessive backflow of the volatile components through the extruder feed throat, a condition which severely limits throughput rates.

The manufacture of various polymers frequently involves a final drying step in order to remove water and other volatile components utilized in the process used to prepare the polymer. In some instances, the drying process involves treating a wet polymer powder containing volatile components such as solvents or other volatile materials in a fluidized bed post dryer. Such equipment is frequently large and costly, comprising large industrial dryers, nitrogen delivery systems, and scrubber systems to control the unwanted escape of volatile components into the environment. While such fluidized bed dryers are typically effective at reducing the moisture and volatile organic content of a variety of polymer powders, processes using them are relatively slow and costly.

During the drying of polymer powders, rates of drying may be dependent upon the particle size and particle size distribution. For example, typical polycarbonate powders isolated following the interfacial polymerization of a dihydroxy aromatic compound with phosgene have a broad distribution of particle sizes ranging from less than 100 micrometers to well above 1 millimeter. The number-averaged particle size is typically less than 200 micrometers. When the moisture level present in a polymer powder falls below a critical moisture content, drying rates may be limited by the rates of liquid diffusion and capillary transport in the powder particles. Thus, the last stages in the drying of a polymer powder may be difficult and require long drying times. It would be desirable, therefore, to discover means for the efficient removal of volatile components from polymer powders which does not involve the use of complex equipment such as fluidized bed post-dryers. In particular, it would be desirable to discover a highly efficient means of removing volatile components from wet polycarbonate powders.

The present invention provides an alternate method for drying solid polymer powders containing volatile components such as water and organic solvents using a devolatilization extruder. The method employs standard equipment of a type readily available in typical polymer finishing facilities and may be adapted to include other operations involving the polymer as well, such as blending with other polymers, functionalization by chemical reaction, and controlled molecular weight adjustment. The present invention reduces the need for fluidized bed-type drying operations, and allows the conversion of solid polymer powders containing high levels of water into polymer compositions which are substantially free of water in a single extrusion step. The removal of water from the polymer powder using the method of the present invention also produces as an unexpected benefit, the simultaneous removal of process solvents and trace impurities, such as residual monomer and low molecular weight oligomers ("lows"), which can impact product characteristics such as plate-out during molding of the final polymer composition. The method of the present invention represents a simple, low cost advance in polymer drying technology, and may afford polymer compositions having improved product properties relative to polymer compositions prepared using conventional drying technology.

In contrast to the present invention, in which a polymer powder containing volatile components is subjected to extrusion devolatilization, the extrusion devolatilization of polymers in solution is well known. For example, Curry and Brauer in Polymer Devolatilization, R. Albalak Ed. Marcel Deker Inc., p 345, 1996, describe the conversion of a solution of high density polyethylene in cyclohexane into a solid polymeric material containing about 10% by weight cyclohexane, using an extruder based process comprising rapid removal of solvent from a superheated solution of the polymer in cyclohexane in an extruder, said extruder being equipped for multistage stripping agent injection and venting.

The process described by Curry and Brauer, however, is inapplicable to the removal of substantial quantities of volatile substances from polymeric materials in powder form, such as wet polycarbonate powders isolated following interfacial polymerization. Such polycarbonate powders typically contain between about 1 and about 20 percent by weight water, and between about 0.001 and about 5 percent by weight methylene chloride. Attempts to devolatilize such powders using an extruder are hampered by the tendency of the steam generated as the polycarbonate powder is sheared and heated above its glass transition temperature to "back out" of the feed throat of the extruder. The steam fluidizes the powdered polymeric material being introduced at the feed throat and causes feeding problems, such as powder escaping from the feed throat and powder "bridging" at the feed throat. Feeding problems of this type may be eased somewhat through the use of auxiliary devices, such as screw feeder stuffers and crammer feeders. However, such devices are frequently ineffective since the fine powders propelled by steam escaping from the extruder may still escape from the stuffers and crammer feeders. In addition such auxiliary devices further increase the cost and complexity of the operation.

Another potential solution to the feeding problems described above is the employment of additional step to compact or agglomerate the wet powder into larger particles prior to introduction of the powder into the extruder. Again, this requires dedicated equipment for additional process steps, resulting in increased process complexity, higher capital and operating costs.

U.S. Pat. No. 5,232,649 discloses a process which uses the mechanical force of the screws in a twin screw extruder to squeeze water and other volatiles from a wet polymeric material. The water is removed from the polymer in a liquid state rather than as steam. While such a process works well for polymeric materials having low glass transition temperatures (Tg), for example materials having Tg's below 100° C., it is inapplicable to the efficient removal of water and other volatile substances from higher Tg polymeric materials such as polycarbonate due to severe limitations of throughput rates.

U.S. Pat. No. 5,717,055 discloses a process for producing polycarbonate pellets by melt-kneading a polycarbonate power in the kneading section of an extruder which comprises a "melt seal" mechanism consisting of reverse-flighted screw elements or a dam ring. High vacuum is applied at a vent downstream of the "melt seal" to remove volatile components. It is well known, however, that when reverse-flighted (left handed) screw elements are used, the upstream screw section must be completely filled over a certain distance in order to generate the pressure necessary to override the reverse-flighted (left handed) section (Rauwendaal, Plastics Formulating & Compounding, Nov./ Dec., 1995). Thus, steam generated in the screw sections preceeding the reverse-flighted section is forced to flow back along the screws and out of the feed throat of the extruder. Again, the emerging steam fluidizes the powdered polymeric material being fed to the extruder and may cause feeding problems. Where the polymer being introduced into the extruder contains a substantial amount of water and other volatile components, the rate of introduction of the polymer must be limited in order to avoid the effects of large amounts of steam escaping through the feed throat and only a fraction of the total torque and power available for polymer processing is used. For productivity reasons, it is a disadvantage not to be able to operate the extruder near the torque and power limitation of the extruder, as in the case of dry powder compounding.

U.S. Pat. No. 4,845,193 discloses a process for producing a low particle polycarbonate comprising supplying a wet polycarbonate powder having a water content of from 0.5 to 10 percent by weight and an organic solvent content of from 0.01 to 5 percent by weight to a vented extruder. The reference discloses a conventional screw design and product output rates fall well below those achieved using the method of the present invention.

Japanese Patent, JP09193230, discloses a process of injecting water into molten polycarbonate in the kneading portion of an extruder as a means of removing volatile components of the polycarbonate. In this case, however, the polymer is already molten at the point at which the water is introduced and steam is not forced back along the screws to the feed throat. The process is inapplicable in cases where the polymeric material to be extruded is a powder containing a substantial amount of water such as wet polycarbonate powder containing methylene chloride.

European Patent Application 0410650 A1 describes a method for preparing polyamide prepolymers by introducing the constituent monomers into an extruder comprising a powder seal. The reference does not disclose the method of the present invention.

BRIEF SUMMARY OF THE INVENTION

The present invention provides a method for removing volatile components from a polymer powder, said method comprising:
Step (A) introducing a polymer powder comprising water into an extruder, said extruder comprising;
  (i) a powder conveying section;
  (ii) a powder seal section located downstream of said powder conveying section;
  (iii) a kneading and melting section located downstream of said powder seal section; and
  (iv) a vacuum vent located downstream of said kneading and melting section;
Step (B) conveying the polymer powder through said powder seal section;
Step (C) heating and shearing the polymer powder in said kneading and melting section to form a polymer melt comprising water; and
Step (D) subjecting said polymer melt to vacuum venting at said vacuum vent.

The present invention further relates to a method for performing a second operation involving the polymer powder, such as blending, compounding or chemical modification, during extruder devolatilization. In one aspect of the present invention, this second operation comprises the introduction of a hydrolysis catalyst into the extruder during the extruder devolatization of wet polycarbonate powder and effecting a controlled molecular weight reduction of the polycarbonate. In another aspect of the present invention a polymer blend is prepared during the extruder devolatilization.

DETAILED DESCRIPTION OF THE INVENTION

Figure 1:
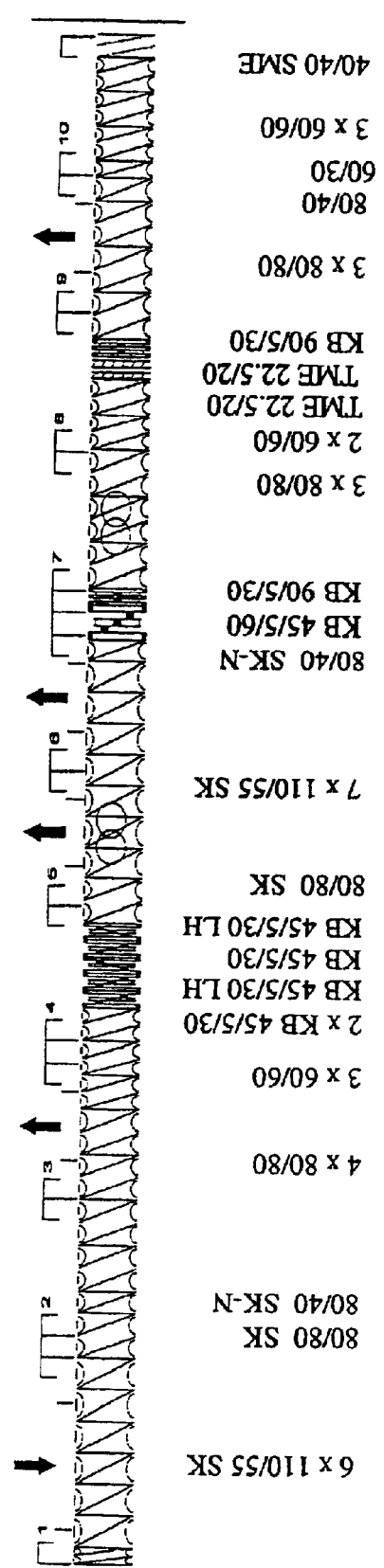
FIG. 1 illustrates an extruder having screw elements configured according to the method of the present invention and shows the locations of an initial powder conveying section, a powder seal section, a kneading and melting section, and a vacuum vent located downstream of said kneading and melting section.

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "polycarbonate" refers to polycarbonates incorporating structural units derived from one or more dihydroxy aromatic compounds and includes copolycarbonates and polyester carbonates.

As used herein, polycarbonates are named according to their constituent bisphenols, thus "bisphenol A polycarbonate" and "1,1-bis(3-methyl-4-hydroxyphenyl)cyclohexane polycarbonate" are used to designate polycarbonates comprising structural units derived from the bisphenols "bisphenol A" and "1,1-bis(3-methyl-4-hydroxyphenyl) cyclohexane" respectively.

"BPA" is herein defined as bisphenol A or 2,2-bis(4-hydroxyphenyl)propane.

As used herein, the term "extruder devolatilization" refers to the removal of volatile components, such as water and methylene chloride, from a polymeric material, such as polycarbonate, using an extruder comprising at least one vacuum vent, and is used interchangeably with the term "extrusion devolatilization".

As used herein, the terms "double screw extruder" and "twin screw extruder" are used interchangeably and have the same meaning.

As used herein the terms "kneading element" and "kneading block" are used interchangeably and have the same meaning.

"Catalyst system" as used herein refers to the catalyst or catalysts that catalyze the hydrolysis of carbonate linkages in polycarbonate undergoing extruder devolatilization in the presence of water.

"Catalytically effective amount" refers to the amount of the catalyst at which catalytic performance is exhibited.

As used herein, the term "molecular weight adjustment" refers to the reduction of the molecular weight of a polymer by catalyst mediated polymer chain scission, said reduction of molecular weight occurring during the extrusion of the polymer. Molecular weight adjustment is illustrated by the partial hydrolysis of polycarbonate which occurs when wet polycarbonate is subjected to extrusion devolatilization in the presence of a hydrolysis catalyst.

As used herein the term "containing a substantial amount of water"means containing about 1 percent by weight of water or more. For example, a polymer powder containing between about 1 and about 20 percent by weight water is said to contain a substantial amount of water.

As used herein, the term a "substantially free of water" means containing less than about 0.5 percent by weight water. For example, a polycarbonate which is substantially free of water contains less than about 0.5 percent by weight water.

As used herein the terms "wet polycarbonate powder" and "wet polycarbonate" refer to polycarbonate powder containing a substantial amount of water as defined herein.

As used herein the term "olefin polymer" refers to polymers comprising structural units derived from olefinic species via polymerization. The polymer ABS is an example of an olefin polymer as used herein in that it represents a polymer comprising structural units derived from the polymerization of the olefinic species, acrylonitrile; 1,3-butadiene; and styrene.

As used herein the term "aliphatic radical" refers to a radical having a valence of at least one comprising a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "aromatic radical" refers to a radical having a valence of at least one comprising at least one aromatic group. Examples of aromatic radicals include phenyl, pyridyl, furanyl, thienyl, naphthyl, phenylene, and biphenyl. The term includes groups containing both aromatic and aliphatic components, for example a benzyl group.

As used herein the term "cycloaliphatic radical" refers to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclopropyl, cyclopentyl cyclohexyl, tetrahydrofuranyl and the like.

The present invention provides a method for the removal of volatile components present in polymer powders. The method of the present invention has been found to be particularly useful when the polymer powder contains a substantial amount of water, for example between about 1 percent by weight and about 20 percent by weight water.

According to the method of the present invention a polymer powder containing water and optionally, one or more other volatile components, such as one or more solvents, is introduced into an extruder comprising a powder conveying section, a powder seal section located downstream of said powder conveying section, a kneading and melting section located downstream of said powder seal section, and a vacuum vent located downstream of said kneading and melting section. The polymer powder may comprise a single polymer, for example bisphenol A polycarbonate, or the polymer powder may comprise a mixture of polymers, for example a blend of bisphenol A polycarbonate with an olefin polymer such as ABS. Polymer powders which may be "devolatilized" using the method of the present invention include polycarbonates, polyphenylene ethers, polyamides, polyesters, polyimides, polyetherimides, polyethersulfones, olefin polymers, and mixtures thereof. The method of the present invention is especially well suited to the removal of volatile components of polycarbonates. Typically, the polymer powder undergoing extruder devolatilization according to the method of the present invention comprises between about 1 and about 20 percent by weight water, and between about 0.001 and about 5 percent by weight organic solvent.

Polycarbonate powders which may be treated according to the method of the present invention to provide polycarbonate compositions comprising reduced levels of volatile components following extrusion devolatilization include polycarbonates comprising repeat units having structural units I

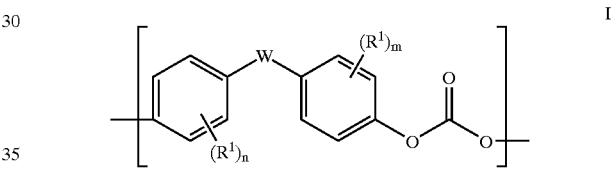

wherein $R^1$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group $$R^3\diagdown_C\diagup R^2$$

wherein $R^2$ and $R^3$ are independently a hydrogen atom, $C_1$–$C_{20}$ alkyl group, $C_4$–$C_{20}$ cycloalkyl group, or $C_4$–$C_{20}$ aryl group; or $R^2$ and $R^3$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof. Bisphenol A polycarbonate is preferred.

Polycarbonates comprising repeat units having structure I are typically prepared by the interfacial polymerization reaction of one or more bisphenols with phosgene in the presence of an acid acceptor such as sodium hydroxide and a phase transfer catalyst such as a quaternary ammonium salt. Bisphenols suitable for use in the preparation of polycarbonates comprising repeat units having structure I include bisphenol A; 2,2-bis(4-hydroxy-3-methylphenyl) propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl) cyclohexane; 1,1-bis(4-hydroxy-3-methylphenyl)

cyclohexane; and 1,1-bis(4-hydroxyphenyl)-3,3,5-trimethylcyclohexane. Bisphenol A is typically preferred.

The extruder used according to the method of the present invention may be any extruder capable creating a powder seal through which powder may be conveyed to at least one melting and kneading section and then to at least one vacuum vent. The extruder according to the method of the present invention has an initial conveying section capable of rapid delivery of polymer powder to a downstream powder seal section. The conveying action of the screw elements together with the continuous delivery of polymer powder to the upstream side of the powder seal forces powder on the downstream side of the powder seal further downstream along the extruder screw channel to at least one kneading and melting section and at least one vacuum vent. This movement of the polymer powder across the powder seal section is referred to as "conveying the polymer powder through the polymer seal section". The extruder according to the method of the present invention may be, for example, a co-rotating, intermeshing double screw extruder; a counter-rotating, non-intermeshing double screw extruder; a single screw reciprocating extruder; or a single screw non-reciprocating extruder.

In one embodiment of the present invention the extruder comprises an unheated powder feed section and a heated powder conveying section. The temperature of the heated powder conveying section is controlled such that the polymer powder is not caused to melt in said powder conveying section. The powder conveying section comprises screw elements which are capable of rapidly delivering polymer powder to a downstream powder seal location. Conveying section screw elements are typified by screw elements having a relatively wide pitch and which are forward flighted. The powder seal section is typically located immediately downstream of the powder conveying section and comprises screw elements which retard the downstream progress of the powder sufficiently to create a powder seal but which do not prevent the movement of the polymer powder across said powder seal. The powder seal comprises densely packed polymer powder in a fully filled portion of the screw channel. Typical screw elements of the powder seal section include narrow pitch screw elements and cylindrical screw elements such those as described in Plastics Compounding D. Todd, Editor, Hanser, p195, 1998. Downstream of the powder seal section is located at least one kneading and melting section in which the polymer powder comprising water is transformed into a polymer melt. Typically the kneading and melt section provides for the application of externally provided heat as well as that produced by shearing. The melt temperature is thus typically higher than the set temperature of the barrel in which the kneading and melting section is located. Typical screw elements used in a kneading and melting zone include forward and reverse flighted kneading blocks. Volatile components present in the polymer powder are prevented from traveling upstream along the screw channel from the kneading and melting section due to the presence of the powder seal which blocks the upstream movement of steam and other volatile components.

The extruder typically comprises between about 5 and about 10 barrels. In instances wherein the extruder comprises a single barrel, the extruder typically has a length to diameter ratio (L/D ratio) of between about 20 and about 60. Longer extruders, those having more barrels or simply having a larger L/D ratio as in the case of single barrel extruders, are frequently better suited to the incorporation of additional melt kneading sections and vacuum vents. Longer extruders may in some embodiments of the present invention provide a greater degree of volatile component removal from the polymer powder being subjected to extrusion devolatilization.

The extruder used according to the method of the present invention typically comprises both heated and unheated sections. Thus, the powder conveying section and powder seal sections may be unheated, or if heated, are heated to a temperature at which there is not sufficient heat transfer to melt the polymer powder present. Heated sections include kneading and melting sections, melt conveying sections downstream of the powder seal section, and vacuum vented sections. Typically, the heated sections have "set" temperatures in a temperature range between about 100° C. and about 400° C., preferably between about 150° C. and about 350° C. Typically the melt temperature of the polymeric material within the extruder will be somewhat higher than the extruder set temperature and will be in a range between about 200° C. and about 450° C., preferably between about 300° C. and about 370° C.

The extruder is operated at a feed rate and a screw speed sufficient to create a powder seal and, additionally, the feed rate and screw speed are controlled to provide the maximum extruder power utilization possible, subject to normal operating limitations such as the maximum melt temperature a polymeric material may be subjected to without its undergoing degradation. Extruder power utilization is dependent upon both extruder torque and screw speed. In one embodiment of the present invention the extruder power utilization is in a range between about 50 and about 100 percent, preferably between about 80 and about 95 percent of the maximum power available. The screw speed is typically in a range between about 50 and about 100 percent of the maximum screw speed achievable. The maximum achievable screw speed varies from machine to machine but is typically in a range between about 200 and about 1200 revolutions per minute (rpm), and in one embodiment of the present invention the screw speed is between about 300 and about 600 rpm.

The extruder used according to the method of the present invention comprises at least one vacuum vent located downstream of at least one kneading and melting section which is turn located downstream of the powder seal section. The vacuum vent is preferably operated at a pressure between about 1 and about 750 torr, and still more preferably in a range between about 1 and about 500 torr. The vacuum applied provides a driving force for the downstream flow of steam generated in upstream kneading and melting sections.

In embodiments of the present invention wherein the extruder comprises multiple vacuum vents, it is generally preferable that the extruder be operated in a manner such that a substantial portion of the volatile components present in the starting polymer powder are removed through the first vacuum vent encountered following kneading and melting of the polymer powder at a first kneading and melting section. The amount of the volatile components being removed at said first vacuum vent may be regulated by controlling the feed rate of the polymer powder, the screw design, extruder operating parameters such as screw speed and temperature, and the pressure at which said first vacuum vent and is operated. The removal of "a substantial portion of the volatile components" at the first vacuum vent means that at least about 50 percent, preferably at least about 80 percent of the volatile components of the starting polymer powder are removed through the first vacuum vent downstream of the first kneading and melting section. In one embodiment of the present invention, the "first vacuum vent" comprises two or more vacuum vents operated in tandem, for example as in Examples 1–4 wherein the vacuum vents at barrels 5 and 6 are operated in tandem.

Typically, the extruder is equipped, according to the method of the present invention, with a plurality of kneading and melting sections and vacuum vents. Typically, the powder seal is followed by a downstream kneading and melting section, said downstream kneading and melting section being followed by at least one vacuum vent, said vacuum vent being followed by one or more additional kneading and melting sections and one or more additional vacuum vents located downstream along the extruder. The extruder may be equipped with one or more melt seal sections downstream of the first vacuum vent. The additional vacuum vents serve to remove volatile components not removed through the first vacuum vent. Typically the additional vacuum vents are operated at a pressure lower than the pressure at which the first vacuum vent is operated. The pressure at which said additional vacuum vents are operated is typically in a range between about 1 and about 500 torr, preferably between about 1 and about 250 torr. In one embodiment of the present invention the extruder comprises at least one additional vacuum vent in addition to the first vacuum vent, said additional vacuum vent being located downstream of said first vacuum vent, said additional vacuum vent being operated at a pressure between about 1 and about 500 torr, preferably between about 1 and about 250 torr. The molten polymer present in the extruder between the first and second vacuum vents is referred to as the partially devolatilized polymer melt.

In one embodiment of the present invention, once a substantial portion of the volatile components have been removed at the first vacuum vent, the molten polymer is subjected to additional kneading and mixing in at least one additional melt kneading section located downstream of said first vacuum vent. The additional melt kneading section may comprise forward flighted screw elements, reverse flighted screw elements, neutral screw elements, dam rings, distributive mixing elements such as TME's (turbine mixing elements) and ZME's ("zahnmisch" elements), or combinations thereof. TME's and ZME's are available from the Werner & Pfleiderer Corporation. The use of secondary kneading sections comprising reverse flighted screw elements, neutral screw elements, dam rings, or combinations thereof typically results in the formation of a melt seal. The extruder may be equipped for multistage stripping agent injection and venting at locations downstream of said melt seal in order to facilitate the removal of persistent volatile components that may present. Persistent volatile components are exemplified by residual monomers, such as bisphenol A, and high boiling by-products formed during the preparation of the polymeric material, for example, diphenyl carbonate formed as a by-product during the interfacial preparation of bisphenol A polycarbonate using phenol as an endcapping agent.

Additives such as flame retardants, heat stabilizers, light stabilizers, pigments, dyes, fillers, plasticizers, impact modifiers, and the like may be added during the extrusion devolatilization process. These are preferably introduced into the polymer melt downstream of the first vacuum vent in order to minimize the loss of said additives through said first vacuum vent. In addition, other polymer resins, such as the olefin polymer ABS, the polyester PBT, and the like may be introduced into the at extruder to afford polymer blends.

The method of the present invention is especially useful for the removal of volatile components present in wet polycarbonate powder isolated following the interfacial polymerization of bisphenol A and phosgene, but may be also be used for the removal of volatile components present in other polymer powders. For example, the method of the present invention applies to the removal of volatile components from polymer powders containing a substantial amount of volatile substances, for example polyphenylene ether powders isolated from a solvent such as toluene or a non-solvent such as methanol and containing from about 1 to about 20 percent by weight residual solvent or non-solvent.

As mentioned, in one embodiment the present invention may be adapted to include other operations involving the polymer powder, such as blending with other polymers, functionalization by chemical reaction, and controlled molecular weight adjustment. In the case of controlled molecular weight adjustment, it would be desirable to prepare a variety of lower molecular weight grades of polycarbonate from a single grade of higher molecular weight polycarbonate. Polycarbonate has been subjected to controlled molecular weight reduction by extrusion of dry polycarbonate powder in the presence of a hydrolysis catalyst, such as tetrabutyl phosphonium hydroxide. A small amount of water is introduced into the extruder in order achieve useful rates of hydrolysis and thereby obtain lower molecular weight polycarbonate. The process must be carefully controlled such that polycarbonate having both the desired molecular weight and an a narrow molecular weight distribution is obtained.

Extrusion devolatilization of wet polycarbonate according to the method of the present invention in the presence of at least one hydrolysis catalyst, such as tetrabutyl ammonium hydroxide, tetrabutyl phosphonium hydroxide, or a mixture thereof results in a controlled downward adjustment of the polycarbonate molecular weight. The degree to which the polycarbonate molecular weight is decreased is a function of the amount of catalyst employed. Although any chemical compound or mixture of compounds which increases the rate of hydrolysis of carbonate units may be employed, quaternary ammonium salts, quaternary phosphonium salts, and mixtures thereof are especially effective catalysts for the controlled molecular weight adjustment of polycarbonate during extruder devolatilization according to the method of the present invention. Suitable hydrolysis catalysts include quaternary ammonium hydroxides having structure II

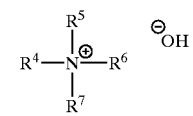

II wherein each of $R^4$–$R^7$ is independently a $C_1$–$C_{20}$ alkyl radical, $C_4$–$C_{20}$ cycloalkyl radical or a $C_4$–$C_{20}$ aryl radical. Suitable quaternary ammonium hydroxides include tetramethyl ammonium hydroxide, tetrabutyl ammonium hydroxide, phenyl trimethyl ammonium hydroxide, and the like.

Suitable hydrolysis catalysts also include quaternary phosphonium hydroxides having structure III

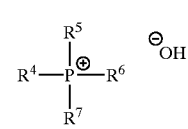

III wherein $R^4$–$R^7$ are defined as in structure II. Suitable quaternary phosphonium catalysts include tetramethyl phosphonium hydroxide, tetrabutyl phosphonium hydroxide, decyl trimethyl phosphonium hydroxide, phenyl trimethyl phosphonium hydroxide, and the like.

Typically, the amount of hydrolysis catalyst employed during the controlled molecular weight adjustment of polycarbonate is in a range between about 10 and about 300, preferably between about 25 and about 50 parts per million based upon the weight of the wet polycarbonate introduced into the extruder. The catalyst may be pre-mixed with the wet polycarbonate powder or added independently of the polycarbonate via the feed throat or at some other point along the extruder.

Although this aspect of the method of the present invention may be used to effect the controlled hydrolysis and thereby the controlled molecular weight reduction of any polycarbonate, for example polycarbonates comprising structural units I, the method is especially well suited to the controlled molecular weight reduction of bisphenol A polycarbonate. Polycarbonates which have been subjected to controlled molecular weight reduction according to the method of the present invention are found to comprise less than about 0.5 weight percent water. Polycarbonates comprising methylene chloride prior to being subjected to controlled molecular weight reduction during the extruder devolatilization process afford lower molecular weight polycarbonates upon extruder devolatilization in the presence of a hydrolysis catalyst according to the method of the present invention and contain less than about 1 part per million methylene chloride.

In another aspect of the present invention, a polymer powder comprising water and optionally, one or more volatile organic compounds is introduced into an extruder together with at least one additional polymer, said extruder being equipped according to the method of the present invention. For example, a wet polycarbonate powder comprising structural units I, about 10 percent by weight water and about 100 parts per million methylene chloride may be introduced together with an additional polymer into an extruder equipped according to the method of the present invention and subjected to extruder devolatilization. The polymeric composition recovered from the extruder contains less than about 0.5 weight percent water. The polymeric composition recovered may be a miscible polymer blend, a partially miscible polymer blend or a highly phase separated polymer mixture.

The additional polymer introduced during the extruder devolatilization process may itself comprise water and one or more volatile organic compounds, or may be substantially free of water and contain only very low levels of volatile organics. The additional polymer may be one or more polycarbonates, polyphenylene ethers, polyamides, polyesters, polyimides, polyetherimides, polyether sulfones, olefin polymers, or mixtures thereof. In one embodiment of the present invention, the additional polymer is a polycarbonate comprising structural units I. In an alternate embodiment of the present invention the additional polymer is an olefin polymer, for example, acrylonitrile-butadiene-styrene rubber (ABS).

FIG. 1 illustrates a 10-barrel extruder configured according to the method of the present invention. The downward arrow indicates the point of introduction of the polymer powder. Upward arrows indicate the position of vacuum vents and optionally, vents to the atmosphere. In FIG. 1 the vent at barrel 3 is a vent to the atmosphere, whereas those at barrels 5, 6 and 9 are vacuum vents. Screw elements comprising the powder conveying section, powder seal section, kneading and melting sections, melt conveying section, melt kneading section and melt seal section are indicated using the conventional shorthand notation for extruder screw elements. FIG. 1 is discussed in greater detail in the Examples section below.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, temperature is in ° C. Screw elements are designated using the conventional (Werner and Pfleiderer) shorthand notation. In the Examples and Comparative Examples which follow, unless otherwise noted, the term polycarbonate refers to bisphenol A polycarbonate. Feed rates reflect the weight of the material actually introduced into the extruder. For wet polycarbonate powders, this means the weight per hour of polycarbonate and water introduced. Feed rates and "throughput rates" may be used interchangeably in describing the method of the present invention since there is little or no loss of the polymer powder being fed to the extruder.

Examples 1–4 and Comparative Examples 1–3

In Examples 1–4 and Comparative Examples 1–3, Werner & Pfleiderer 58 mm, co-rotating, intermeshing, 10-barrel, twin screw extruder (ZSK-58 Mega Compounder) possessing three vacuum vents and a vent to the atmosphere was employed. An extruder capable of operating at high specific torque and high power, such as the ZSK-58 Mega Compounder, may be used to advantage in the creation of a powder seal. The extruder was configured with 10 barrels and spacers to accommodate 11-barrel shafts. Barrel 1 was a 6 diameter feed barrel where wet polycarbonate powder was fed. Stabilizer, and optionally, color concentrates, were introduced at barrel 7 via a ZSB-40 side feeder. Barrel 3 (located between 13 to 16 diameters) was vented at atmospheric pressure through a vent stuffer. Barrels 5 and 6 (located between 21–28 diameters) and barrel 9 (located between 37–40 diameters) were equipped with vacuum vents. Steam from the downstream vents was condensed using heat exchangers.

Polycarbonate resin powders comprising between about 8 and about 12 weight percent water were used as the raw materials. The extruder was divided into 9 heating zones with the following set temperature profile: 220° C. (Zone 1, barrel 2), 265° C. (Zone 2, barrel 3), 275° C. (Zone 3, barrel 4), 290° C. (Zone 4, barrel 5), 295° C. (Zone 5, barrel 6), 295° C. (Zone 6, barrel 7), 300° C. (Zone 7, barrel 8), 300° C. (Zone 8, barrel 9), 305° C. (Zone 9, barrel 10), 305° C. (die). The polymer melt temperature was in a range between about 300° C. and about 400° C. The extruder screws were configured as shown in FIG. 1. The extruder screw configuration comprised a conveying section consisting initially of six 110/55 SK undercut screw elements in barrel 1 to facilitate the feeding of the polycarbonate powder. The conveying section included additional screw elements "transitioning" from the initial six elements to regular non-undercut 80/80 elements. The powder seal section consisted of four 80/80 elements and three 60/60 narrow pitch elements located between barrels 3 and 4. The powder seal zone was followed by a kneading and melting section in barrel 4 consisting of two 45/5/30 kneading blocks, a 45/5/30LH reverse pitched kneading block, a 45/5/30 kneading block, and a 45/5/30LH reverse pitched kneading block. A significant portion of the wet powder was kneaded and melted in this kneading and melting section. The steam released as the polycarbonate was sheared and heated above its glass transition temperature was vented through the vacuum vents located at barrels 5 and 6.

The vacuum vents at barrels 5 and 6 were typically operated in tandem at a pressure between about 350 and about 500 torr. Most of the water initially present in the polymer was removed through the vacuum vents located at barrels 5 and 6. Beyond the vacuum vents at barrels 5 and 6, the polymer melt passed through a melt seal formed by 40/5/60 and 90/5/30 neutral kneading elements located between 27 and 28 diameters (the spacers between barrels 6 and 7). Optionally, stabilizer and color concentrates were introduced at barrel 7 (located between 29 and 32 diameters) via a ZSB-40 side feeder. Two turbine mixing elements (TME's) and the neutral 90/5/30 kneading element facilitated mixing and formation of a melt seal. An additional vacuum vent was located at barrel 9 and was operated at a pressure below about 200 torr. The screw design illustrated in FIG. 1 was used in Examples 1–4.

In Examples 1–4 and Comparative Examples 1–3 the extruder was operated at between about 600 and about 1000 rpm, and at between about 40 and about 90% of the maximum torque. The data in Table 1 demonstrate that the powder seal screw design of the method of the present invention effectively prevents the backflow of steam released from the wet polycarbonate powder during kneading and melting and provides for a rapid throughput of polymer with throughput rates between about 1100 and about 1650 pounds of polymer powder per hour. There was essentially no steam observed emerging from either the extruder feed throat or the upstream atmospheric vent located at barrel 3. The extrusion operation was stable.

In Table 1 the column heading "Moisture Level" indicates the amount of water present in the starting polycarbonate powder and is expressed as percent by weight. "Screw Speed" is expressed in revolutions per minute (rpm). The column heading "P Vacuum Vent 5&6" indicates the pressure, expressed in torr, at which the vacuum vents located at barrels 5 and 6 were operated. The column heading "P Vacuum Vent 9" indicates the pressure, expressed in torr, at which the vacuum vent located at barrel 9 was operated. "Torque %" indicates the percentage of the maximum available torque. "Feed Rate" is expressed in pounds of wet polycarbonate per hour and in Examples 1–4 is synonymous with "throughput rate. "CE-1" indicates Comparative Example 1. Other Comparative Examples are indicated analogously.

TABLE 1

| Example | Moisture Level | Screw Speed | P Vacuum Vent 5 & 6 | P Vacuum Vent 9 | Torque % | Feed Rate |
|---|---|---|---|---|---|---|
| 1 | 7 | 590 | 380 | 180 | 91 | 1200 |
| 2 | 7 | 790 | 380 | 180 | 86 | 1450 |
| 3 | 7 | 990 | 380 | 180 | 85 | 1650 |
| 4 | 12 | 600 | 380 | 180 | 87 | 1100 |
| CE-1 | 7 | 740 | 380 | 180 | 83 | 1300 |
| CE-2 | 7 | 400 | 380 | 180 | 44 | 400 |
| CE-3 | 7 | 750 | 380 | 180 | 43 | 700 |

In Comparative Examples 1 and 2 (CE-1,2) an extruder was employed which was identical to that used in Examples 1–4 with the exception powder seal zone was eliminated and all the screw elements in that section was replaced by 110/55 SK elements. Significant amounts of steam and polycarbonate powder were observed emerging from the upstream vent stuffer (located at barrel 3) and feed-throat because the high pitch 110/55 SK undercut elements have wide and deep screw channel which allowed steam to travel upstream. The steam emerging at the vent stuffer and feed throat was observed to force polycarbonate powder out of the vent stuffer and feed-throat. Over 10% of the total polycarbonate powder fed to the extruder was found to have been forced out of the vent stuffer and feed-throat in Comparative Example 2 (CE-2).

In Comparative Example 3 (CE-3) the extruder screw configuration was identical to that used in Example 2. The operating conditions were also identical to the operating conditions used in Example 2 with the exception that the feed rate was 700 pounds per hour of wet polycarbonate powder instead of 1450 pounds per hour. Steam was observed emerging from the upstream vent at barrel 3 and the feed throat. This was due to the fact that under the operating conditions employed, the powder seal zone was not fully filled by the polycarbonate powder and thus, no powder seal was created. In the absence of the powder seal, steam generated as the polycarbonate was subjected to temperatures above the boiling point of water was allowed to travel upstream along the extruder screw channel and emerge at the vent at barrel 3 and the feed throat.

Example 5

Wet bisphenol A polycarbonate powder having a weight average molecular weight of about 55,000 daltons (as determined by gel permeation chromatography against polystyrene standards) containing 7 percent by weight water and 100 parts per million methylene chloride, and dry bisphenol A polycarbonate powder containing about 0.3 percent by weight water and having a weight average molecular weight of about 38,500 daltons (as determined by gel permeation chromatography against polystyrene standards) were fed to a 58 mm, co-rotating, intermeshing, 10 barrel, twin screw extruder equipped and operated, except as otherwise specified, as in Example 2 at a weight ratio of 65:35 of wet to dry resins at a total throughput rate of 1500 pounds per hour. The screw speed was 800 rpm and the torque was 85% of the maximum available torque. A stabilizer concentrate was added at barrel 7 through a side stuffer. The operation was very stable and no steam was observed at the vent at barrel 3 or at the feed throat, and their were no feeding problems.

Examples 6–11 and Comparative Examples 4–9

In Examples 6–11 and Comparative Examples 4–9, a 58 mm, co-rotating, intermeshing, 10 barrel, twin screw extruder equipped and operated, except as otherwise specified, as in Example 2 was employed. The extruder was operated at about 500 rpm and at about 85% of the maximum torque. The throughput rates were between about 1000 and about 1200 pounds of polymer per hour.

Examples 6–11, wet bisphenol A polycarbonate powder, prepared by interfacial polymerization, was subjected to extrusion devolatilization, said polycarbonate comprising about 7 percent by weight water, and between about 1 and about 100 parts per million methylene chloride. A hydrolysis catalyst, tetrabutyl phosphonium hydroxide, was diluted in deionized water to a 1% solution and was injected into extruder using a injection nozzle located in the spacer plate between barrel one and barrel two in an amount corresponding to between about 25 and about 50 parts per million based upon the weight of wet polycarbonate employed. In Comparative Examples 4–9, dry polycarbonate powder comprising less than about 0.5 percent by weight water, and between about 1 and about 100 parts per million of methylene chloride was subjected to the conditions of extrusion devolatilization. A hydrolysis catalyst, tetrabutyl phosphonium hydroxide, was diluted in deionized water to a 1% solution and was injected into extruder using a injection nozzle located in the spacer plate between barrel one and two in the amount corresponding to between about 25 and about 200 parts per million tetrabutyl phosphonium hydroxide based upon the weight of polycarbonate employed.

Data for Examples 6–11 and Comparative Examples 4–9 are gathered in Table 2 wherein, "Catalyst Level" indicates the amount of tetrabutyl phosphonium hydroxide present during the extrusion. Values of catalyst level are expressed in parts per million (ppm). The weight average molecular weight, $M_w$, as determined by gel permeation chromatography using polystyrene molecular weight standards and chloroform as the eluant, is given for the polycarbonate following extrusion. Values given for $M_w$, are in grams per mole. "% Moisture" indicates the amount of water present in the polycarbonate following extrusion. Values of "% Moisture" are expressed as weight percent water and were determined by thermal gravimetric analysis. The column headings "$CH_2Cl_2$" and "[OH]" indicate the amounts of residual methylene chloride and hydroxyl group concentrations, respectively, present in the polycarbonate following extrusion. The values given for "$CH_2Cl_2$" and "[OH]" are expressed in parts per million and were determined by gas chromatography and quantitative infrared spectroscopy respectively.

TABLE 2

| Example | Catalyst Level | $M_w$ | % Moisture | $CH_2Cl_2$ | [OH] |
|---|---|---|---|---|---|
| 6 | 0 | 29384 | 0.37 | nd | 61 |
| 7 | 0 | 30256 | 0.29 | nd | 73 |
| 8 | 5 | 29564 | 0.38 | nd | 66 |
| 9 | 25 | 27856 | 0.29 | nd | 349 |
| 10 | 40 | 24005 | 0.28 | nd | 1033 |
| 11 | 50 | 20650 | 0.41 | nd | 1631 |
| CE-4 | 0 | 29541 | 0.45 | 0.70 | 98 |
| CE-5 | 25 | 28768 | 0.43 | 0.90 | 220 |
| CE-6 | 50 | 27514 | 0.30 | 0.70 | 388 |
| CE-7 | 100 | 26070 | 0.38 | 0.80 | 683 |
| CE-8 | 150 | 20592 | 0.31 | 0.90 | 1643 |
| CE-9 | 200 | 17132 | 0.23 | 0.80 | 2876 |

Figure 2:
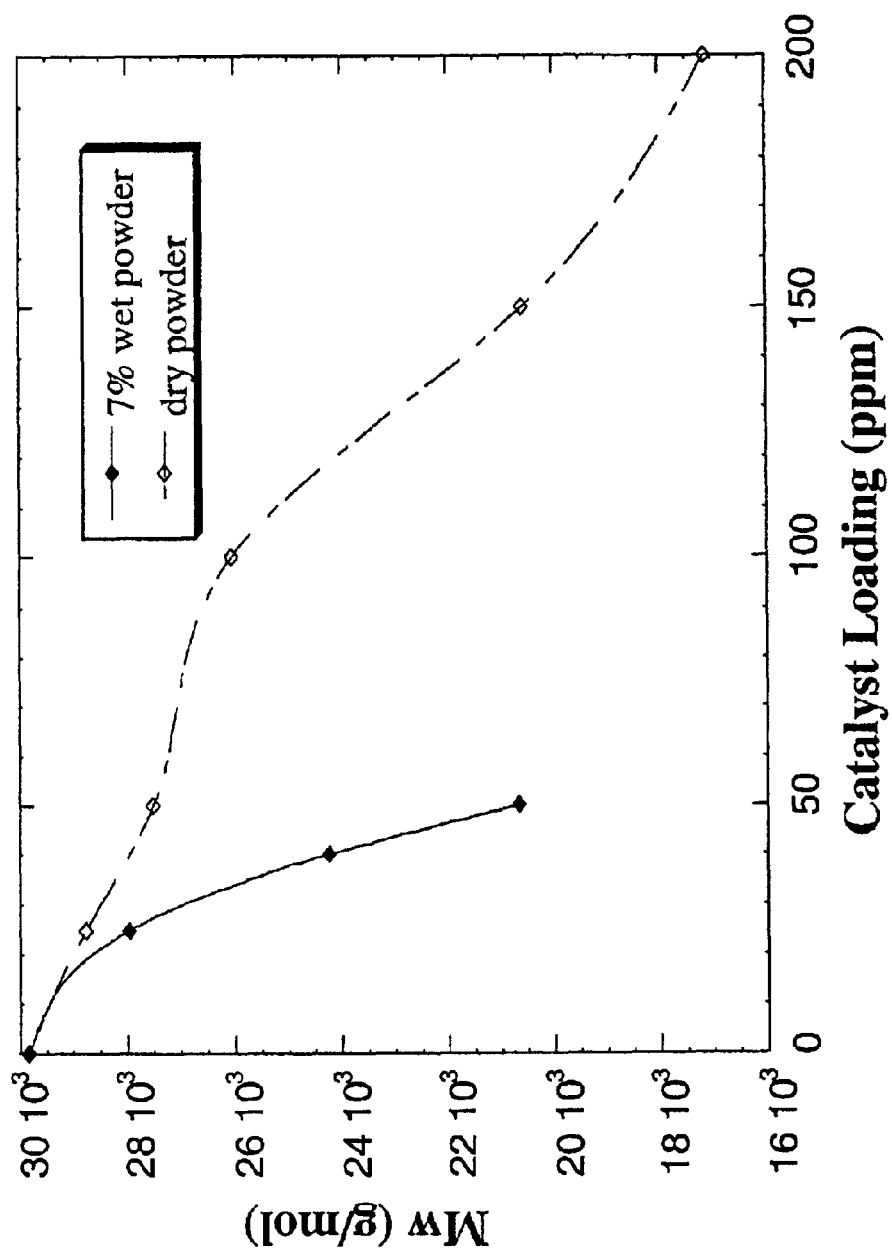
FIG. 2 illustrates the effect of water present during extrusion devolatilization on the controlled molecular weight adjustment of polycarbonate.

The data in Table 2 reveal that the molecular weight of the polycarbonate may be adjusted while being subjected to extrusion devolatilization, and the greater efficiency of catalyst utilization when the molecular weight adjustment is carried out during the extruder devolatilization of the wet polycarbonate powder relative to molecular weight adjustment using dry polycarbonate powder. This effect is further illustrated in FIG. 2 which shows the relationships between catalyst loading and the molecular weight of the polycarbonate obtained after extrusion of the wet polycarbonate used in Examples 6–11 (labeled "7% wet powder") and the dry polycarbonate used in Comparative Examples 4–9 (labeled "dry powder").

Figure 3:
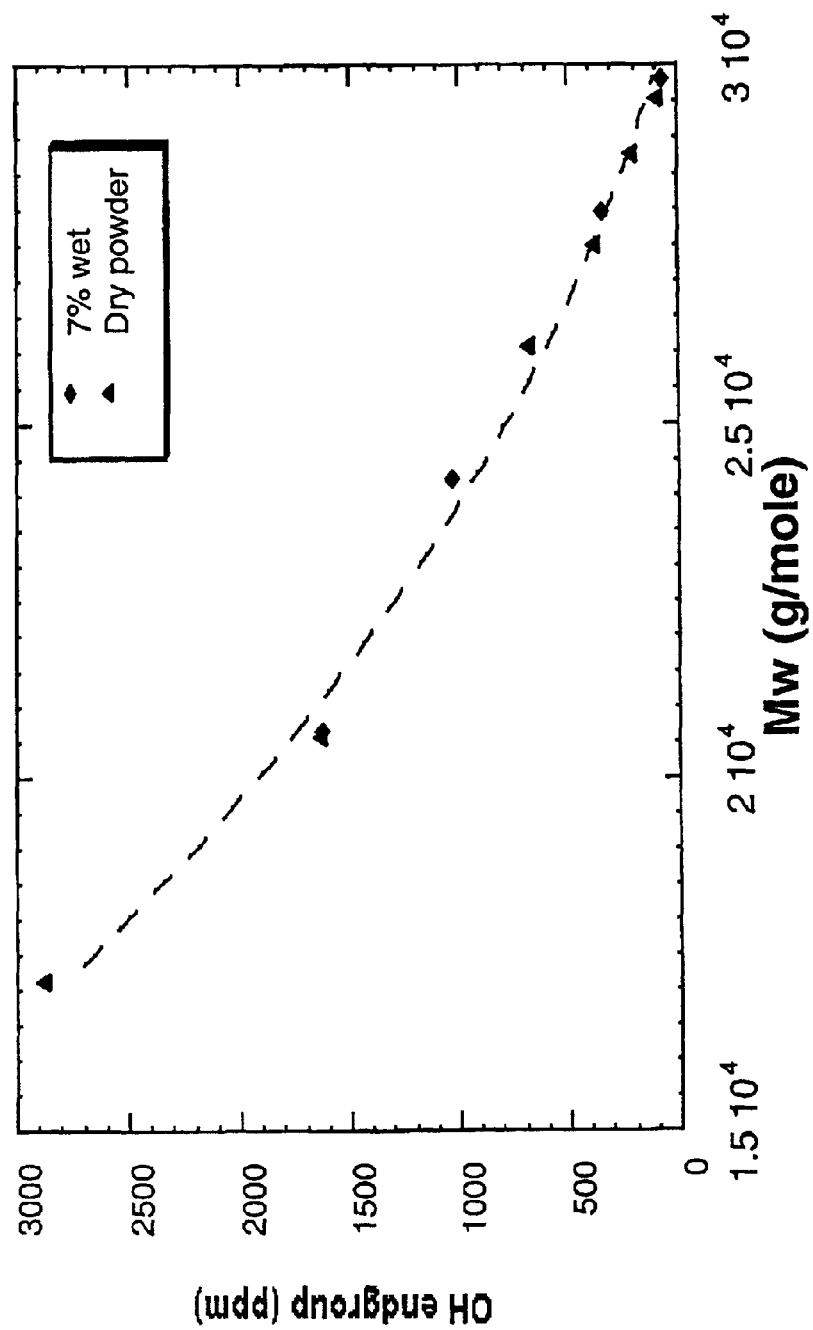
FIG. 3 illustrates the relationship between polycarbonate molecular weight and hydroxyl endgroup concentration observed in the controlled molecular weight adjustment of polycarbonate.

The data in Table 2 further reveal that hydroxyl endgroup concentrations in the polycarbonate compositions following extrusion are essentially the same for polycarbonate compositions possessing similar molecular weights, indicating that the molecular weight reduction taking place in both Examples 6–11 and Comparative Examples 4–9 occurs by the same mechanism. This effect is illustrated in FIG. 3 in which the concentration of OH endgroups present in the extruded polycarbonate samples obtained in Examples 6–11 and Comparative Examples 4–9 is plotted against the weight average molecular weight of said polycarbonate samples.

The data in Table 2 also reveal the effectiveness of the method of the present invention in reducing the level of residual solvent present in polycarbonate. Examples 6–11 are shown to be free of detectable levels of residual methylene chloride. The symbol "nd" indicates that methylene chloride, if present in the polycarbonate composition following extrusion devolatilization, is present at a concentration below 0.05 ppm, the detection limit of methylene chloride in polycarbonate by the gas chromatographic method employed. The data for given for Comparative Examples 4–9 indicate the presence of detectable levels of methylene chloride in samples prepared by the extrusion devolatilization of polycarbonate samples containing less than 0.5 percent by weight water, the upper limit of moisture content of the dry polycarbonate powders employed in Comparative Examples 4–9.

Example 12

A mixture of 1111 pounds of wet bisphenol A polycarbonate powder having a weight average molecular weight of about 25,000 Daltons (as determined by gel permeation chromatography against polystyrene standards) containing 10 percent by weight water and 100 parts per million methylene chloride is mixed with 1000 pounds of dry 1,1-bis-(4-hyrdoxy-3-methyl)cyclohexane polycarbonate (BCC polycarbonate) powder having a weight average molecular weight of about 25,000 Daltons (as determined by gel permeation chromatography against polystyrene standards) and the mixture is fed as a powder to a 58 mm, co-rotating, intermeshing, 10 barrel, twin screw extruder which is equipped and operated as in Example 1. The mixture is extruded at a maximum throughput of about 1030 pounds per hour at about 600 rpm. The percent utilization of the maximum available torque is in a range between about 70 and about 95 percent. A polycarbonate blend comprising bisphenol A polycarbonate and BCC polycarbonate is produced, said blend comprising less than 0.5 percent by weight water and less than 1 part per million methylene chloride, said blend having a Tg of between 132 and 140° C.

The invention has been described in detail with particular reference to preferred embodiments thereof, but it will be understood by those skilled in the art that variations and modifications can be effected within the spirit and scope of the invention.

What is claimed is:

1. A method for removing volatile components from a polymer powder, wherein said polymer powder is a polycarbonate comprising structural units I

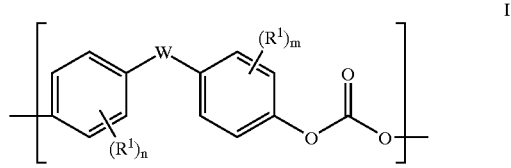

wherein $R^1$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

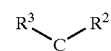

wherein $R^2$ and $R^3$ are independently a hydrogen atom, $C_1$–$C_{20}$ alkyl group, $C_4$–$C_{20}$ cycloalkyl group, or $C_4$–$C_{20}$ aryl group; or $R^2$ and $R^3$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof, said method comprising:

Step (A) introducing the polymer powder comprising water into an extruder, said extruder comprising;
  (i) a powder conveying section;
  (ii) a powder seal section located downstream of said powder conveying section;
  (iii) a kneading and melting section located downstream of said powder seal section; and
  (iv) a vacuum vent located downstream of said kneading and melting section;
Step (B) conveying the polymer powder through said powder seal section;
Step (C) heating and shearing the polymer powder in said kneading and melting section to form a polymer melt comprising water; and
Step (D) subjecting said polymer melt to vacuum venting at said vacuum vent.

2. A method according to claim 1 wherein said polymer powder comprising water further comprises one or more volatile organic compounds, said volatile organic compounds comprising one or more solvents.

3. A method according to claim 2 wherein said organic solvents comprise methylene chloride.

4. A method according to claim 2 wherein the polymer powder comprises between about 0.1 and about 20 percent by weight water, and between about 0.001 to about 5 percent by weight of one or more organic solvents.

5. A method according to claim 1 wherein the extruder is a twin screw, co-rotating extruder.

6. A method according to claim 1 wherein the extruder further comprises between about 5 and about 10 barrels.

7. A method according to claim 1 wherein the extruder is operated with set temperatures of heated zones in a temperature range between about 100° C. and about 400° C.

8. A method according to claim 1 wherein Step (C) comprises heating the polymer melt at a temperature in a range between about 200° C. and about 450° C.

9. A method according to claim 1 wherein said vacuum vent operated in a range between about 1 and about 750 torr.

10. A method according to claim 1 wherein the extruder further comprises at least one additional vacuum vent.

11. A method according to claim 1 having an L/D ratio between about 20 and about 60.

12. A method according to claim 1 wherein said kneading and melting section comprises both forward and rearward flighted kneading blocks.

13. A method according to claim 1 wherein said extruder further comprises at least one melt seal section.

14. A method according to claim 1 further comprising recovering a polymer composition which is substantially free of water.

15. A method according to claim 14 wherein said polymer composition contains less than about 0.5 percent by weight water and less than about 1 part per million methylene chloride.

16. A method according to claim 1 wherein Step (A) further comprises introducing a hydrolysis catalyst into the extruder.

17. A method according to claim 16 wherein the hydrolysis catalyst is a quaternary ammonium hydroxide, a quaternary phosphonium hydroxide, or a mixture thereof.

18. A method according to claim 16 wherein the hydrolysis catalyst is a quaternary ammonium hydroxide having structure II $$R^4-\overset{\overset{R^5}{|}}{\underset{\underset{R^7}{|}}{N^\oplus}}-R^6 \quad {}^\ominus OH \qquad II$$

wherein each of $R^4$–$R^7$ is independently a $C_1$–$C_{20}$ alkyl radical, $C_4$–$C_{20}$ cycloalkyl radical or a $C_4$–$C_{20}$ aryl radical.

19. A method according to claim 16 wherein the hydrolysis catalyst is a phosphonium hydroxide having structure III $$R^4-\overset{\overset{R^5}{|}}{\underset{\underset{R^7}{|}}{P^\oplus}}-R^6 \quad {}^\ominus OH \qquad III$$

wherein each of $R^4$–$R^7$ is independently a $C_1$–$C_{20}$ alkyl radical, $C_4$–$C_{20}$ cycloalkyl radical or a $C_4$–$C_{20}$ aryl radical.

20. A method according to claim 16 further comprising recovering a polycarbonate having a lower molecular weight than the polycarbonate introduced into the extruder.

21. A method according to claim 20 wherein the hydrolysis catalyst is introduced in an amount corresponding to between about 10 and about 300 parts per million based upon the weight of the polycarbonate introduced into the extruder.

22. A method according to claim 20 wherein the polycarbonate recovered from the extruder comprises less than about 0.5 percent by weight water and less than about 1 part per million methylene chloride.

23. A method according to claim 16 wherein the polymer powder comprises bisphenol A polycarbonate.

24. A method according to claim 1 wherein Step (A) further comprises introducing at least one additional polymer into the extruder.

25. A method according to claim 24 wherein said additional polymer is selected from the group consisting of polycarbonates, polyphenylene ethers, polyamides, polyesters, polyimides, polyetherimides, polyothersulfones, olefin polymers, and mixtures thereof.

26. A method according to claim 24 wherein said additional polymer is a polycarbonate.

27. A method according to claim 26 wherein said polymer powder comprising water is bisphenol A polycarbonate and said additional polymer is a polycarbonate comprising structural units I $$\left[ \underset{(R^1)_n}{\underset{|}{\bigcirc}}-W-\underset{(R^1)_m}{\underset{|}{\bigcirc}}-O-\overset{O}{\underset{||}{C}}-O \right] \qquad I$$

wherein $R^1$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group $$R^3\diagdown_C\diagup R^2$$

wherein $R^2$ and $R^3$ are independently a hydrogen atom, $C_1$–$C_{20}$ alkyl group, $C_4$–$C_{20}$ cycloalkyl group, or $C_4$–$C_{20}$ aryl group; or $R^2$ and $R^3$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

28. A method according to claim 27 wherein said additional polymer is 1,1-bis(3-methyl-4-hydroxyphenyl)cyclohexane polycarbonate.

29. A method according to claim 24 wherein said additional polymer is ABS.

30. A method for removing water and methylene chloride from bisphenol A polycarbonate powder, said method comprising:
   Step (A) introducing bisphenol A polycarbonate powder comprising water and methylene chloride into an extruder, said extruder comprising;
      (i) a powder conveying section;
      (ii) a powder seal section located downstream of said powder conveying section;
      (iii) a kneading and melting section located downstream of said powder seal section; and
      (iv) a vacuum vent located downstream of said kneading and melting section;
   Step (B) conveying said bisphenol A polycarbonate through said powder seal section;
   Step (C) heating and shearing said bisphenol A polycarbonate powder in said kneading and melting section to form a polymer melt comprising water and methylene chloride;
   Step (D) subjecting said polymer melt to vacuum venting at said vacuum vent.

31. A method according to claim 30 wherein said bisphenol A polycarbonate comprises between about 0.1 and about 20 percent by weight water, and between 0.1 and about 5 percent by weight methylene chloride.

32. A method according to claim 30 wherein said extruder is a twin screw co-rotating extruder.

33. A method according to claim 30 wherein the extruder further comprises between about 5 and about 10 barrels.

34. A method according to claim 30 wherein the extruder is operated with set temperatures of heated zones in a range between about 100° C. and about 400° C.

35. A method according to claim 30 wherein Step (C) comprises heating and shearing the polymer melt at a temperature in a range between about 200° C. and about 450° C.

36. A method according to claim 30 wherein said vacuum vent is operated in a range between about 1 and about 750 torr.

37. A method according to claim 30 wherein the extruder further comprises at least one additional vacuum vent.

38. A method according to claim 30 wherein said kneading and melting section comprises two or more forward flighted kneading blocks.

39. A method according to claim 30 wherein said kneading and melting section comprises both forward and rearward flighted screw elements.

40. A method according to claim 30 wherein said extruder further comprises a melt seal section, said melt seal section comprising a distributive mixing element.

41. A method according to claim 30 further comprising recovering a bisphenol A polycarbonate composition which contains less than about 0.5 percent by weight water and less than about 1 part per million methylene chloride.

42. A method according to claim 30 wherein the extruder is operated at between about 50 and about 100 percent of its maximum power utilization.

43. A method according to claim 30 wherein said extruder has a length to diameter ratio between about 20 and about 60.

* * * * *